United States Patent [19]

Jägers

[11] 4,215,958
[45] Aug. 5, 1980

[54] DRILLING MACHINE

[75] Inventor: Leopold JäËü ÖïÏü üö ü Ä üä

[74] Inventor: Leopold Jägers, Euskirchen, Fed. Rep. of Germany

[73] Assignee: Trennjäger Maschinenfabrik, Inh. Leopold Jägers, Euskirchen, Fed. Rep. of Germany

[21] Appl. No.: 943,694

[22] Filed: Sep. 19, 1978

[30] Foreign Application Priority Data

Sep. 20, 1977 [DE] Fed. Rep. of Germany ....... 2742258

[51] Int. Cl.² .......................................... B23B 39/16
[52] U.S. Cl. ...................................... 408/38; 408/42; 408/51; 408/52
[58] Field of Search ...................... 408/42, 37, 39, 52, 408/51, 38; 269/87.3

[56] References Cited

U.S. PATENT DOCUMENTS

| | | | |
|---|---|---|---|
| 1,511,164 | 10/1924 | Hey et al. | 408/52 X |
| 2,803,840 | 8/1957 | McShirley | 408/38 X |
| 3,094,015 | 6/1963 | Mead | 408/39 X |
| 3,253,484 | 5/1966 | Hill | 408/38 X |
| 3,507,025 | 4/1970 | Ankeney | 408/52 X |
| 3,584,523 | 6/1971 | Evans | 408/37 |
| 3,685,915 | 8/1972 | Vierstraete | 408/51 X |
| 3,977,804 | 8/1976 | Kitagawa | 408/42 X |
| 4,147,460 | 4/1979 | Miyakawa | 408/39 |

FOREIGN PATENT DOCUMENTS

2749322 5/1978 Fed. Rep. of Germany ............. 408/38

*Primary Examiner*—William R. Briggs
*Attorney, Agent, or Firm*—J. Harold Nissen

[57] ABSTRACT

A drilling machine for working on longer workpieces, such as steel profiles having a fixed, non-variable frame. The machine includes a horizontal machine underpart arranged transversely to the longitudinal axis of the workpiece, two vertical side parts attached to the underpart ends and a horizontal upper beam attached on the side parts, and three drilling units each having a drilling spindle, a gear and a motor. The drilling units are shiftable in a plane parallel to the frame. The first drilling unit has a horizontal drilling spindle and is attached to a side part to the side of the workpiece; the second drilling unit has a second spindle arranged horizontally to the first drilling unit and on the opposing side of the workpiece; and, the third drilling unit has a vertical spindle and is attached to the upper beam. The second drilling unit has its horizontal drilling spindle on a horizontally driven carriage provided with lower wheels and upper wheels. The lower wheels on at least one rail which is attached to the machine underpart, and the upper wheels run on at least one rail which is attached to the upper beam.

17 Claims, 8 Drawing Figures

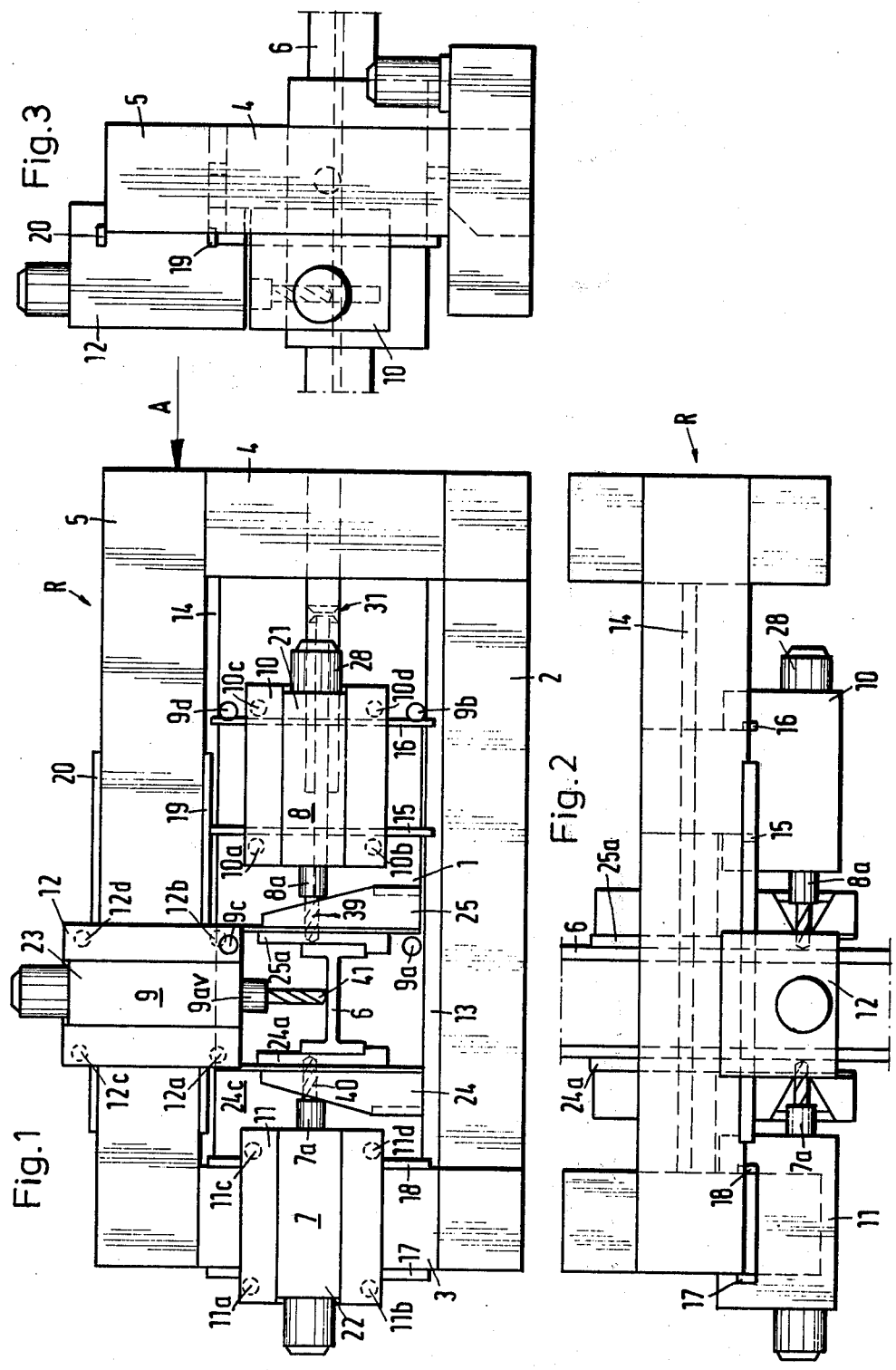

DRILLING MACHINE

BACKGROUND OF THE INVENTION

This invention relates to drilling machines for working on longer profiles.

More particularly, the invention is concerned with drilling machines of the type suitable for work on more than one side, preferably three sides of elongated steel profiles, and includes a fixed invariable frame comprising a horizontal machine underpart arranged transversely to the longitudinal axis of the workpiece, two vertical side parts attached on the side parts. Three drilling units are provided, each having a drilling spindle, a gear and a motor. The drilling units are shiftable in a plane parallel to the frame. The first drilling unit has a horizontal drilling spindle and is attached to a side part and directed towards one side of the workpiece. The second drilling unit also has a horizontal spindle which is generally directed towards the first drilling unit and is arranged on the opposing side of the one side of the workpiece; and, the third drilling unit has a vertical spindle and is attached to the upper beam.

Drilling machines with a fixed, invariable frame and cradles are known. The first and second drilling units are arranged on each of the two vertical side parts, and each of the drilling units are arranged vertically as a cradle, and on the upper beam a third cradle is arranged. A horizontally mobile spindle sleeve bearing the drilling spindles is arranged in each cradle. The first and second drilling units, which are attached to the side parts, cannot be arranged at any given distance from each other, since the distance of the drilling units from the workpiece is dependent on the limited degree to which the spindle sleeve can be extended outwards; and therefore, very broad profiles can not be worked suitably. When narrow profiles are to be worked, then the spindle sleeves must be extended a long way outwards, and this results in a diminishment of the measuring accuracy of the driller.

Drilling machines are known which are capable of working with a high degree of accuracy on both narrow and broad profiles.

In order to be able to work with a high degree of accuracy on both narrow profiles as well as very broad profiles, the known drilling machines have drilling units provided with horizontal drilling spindles attached to two horizontally movable drilling cradles, which bear an upper beam on their upper side which is not connected with the machine underpart, on which upper beam a further cradle is movably attached for a drilling unit with a vertical drilling spindle. In these known drilling machines, the spindle sleeves are not required to be driven outwards very far for small profiles, as the cradle can move the drilling units near enough to the workpiece. Such cradles, however, are not guided within a closed frame but between the machine underpart and the free upper beam, so that inaccuracies in measuring may occur due to the low stability. Indeed, it was attempted to increase the stability by positioning the drilling units inside the cradle and not on the outside of the cradle so that they lie in the central plane of the machine underpart and the upper beam. However, inaccuracies in measurement can not be avoided completely by doing this, and, moreover, the drilling units are difficult to reach.

Furthermore, in the two known drilling machines, the slide surfaces necessary for the cradle are susceptible to disturbance and are difficult to keep clean. Also, sliding friction, which disturbs positioning, must be overcome for movement of the cradle.

The object of the invention is to provide a drilling machine of simple construction having a low susceptibility to disturbance. This low susceptibility to disturbance permits drilling of very broad workpieces and thereby achieves a high degree of measuring accuracy even with narrow workpieces.

SUMMARY OF THE INVENTION

In order to overcome the aforesaid difficulties and accomplish the aforesaid object, the invention proposes that the second drilling unit, which has a horizontal drilling spindle, be arranged on a horizontally driven carriage. This horizontally driven carriage is arranged with lower wheels which run on, and are associated with at least one rail, which is attached to the machine underpart and with its upper wheels to run and cooperate with at least one rail attached to the upper beam.

The fixed invariable frame leads to high stability and measuring accuracy. The carriage, which is transversely movable in the frame, permits working on very broad workpieces and also provides for a high degree of measuring accuracy with narrow workpieces, as the drilling spindles can be driven near to the workpiece without the spindle sleeve projecting a long distance. A carriage is more simply and economically produced than a cradle and can be driven more quickly, as only rolling friction is to be overcome instead of sliding friction. Running or rolling surfaces are more easily kept clean than slide or sliding surfaces, thus permitting a high degree of measuring accuracy and reliability.

In an advantageous embodiment, the invention proposes that a second vertically running carriage be attached to the carriage. This second carriage carries the second drilling unit and is provided with running wheels which run on vertical rails provided on the first carriage. Such a second carriage replaces a cradle and thereby further increases reliability.

It is further proposed that a horizontally movable cradle be attached on the second carriage and that the second drilling unit be arranged on the second carriage. Such a cradle replaces a longitudinally movable spindle sleeve and shows not only improved solidity and measuring accuracy over a spindle sleeve arrangement; and, a greater running path can also be produced by a cradle.

A further proposal is that the first drilling unit be arranged on a third carriage which runs with its wheels on vertical rails of the side part. A horizontally movable cradle can then be attached to the third carriage, and the first drilling unit is arranged on the aforesaid horizontally movable cradle. It is further proposed that the third drilling unit be arranged on a fourth carriage which runs with its wheels on horizontal rails provided on or carried by the upper beam. In this way, a vertically movable cradle can be attached to the fourth carriage, and the third drilling unit can be arranged on the aforesaid vertically movable cradle. Such consistent replacing of cradles by carriages and of spindle sleeves by cradles quite substantially increases reliability and measuring accuracy of the drilling machine.

As the second, third and fourth carriages can be constructed the same as one another, the number of different parts as well as the number of spare parts is reduced. Moreover, an additional clamping device is unnecessary and not required for clamping the workpiece horizontally if a clamping jaw is attached to the first carriage; such clamping jaw works together with a clamping jaw which is attached to the frame. Therefore, the time necessary for clamping is thereby shortened.

A support between the clamping jaws which hinders the movement of the first carriage is avoided if rollers are either attached to the first carriage or to the clamping jaw of the first carriage to bear the workpiece. The first carriage is preferably driven by a hydraulic cylinder-piston unit so that a high clamping pressure is produced in a manner causing as little disturbance as possible. The second, third and/or fourth carriages are preferably moved by means of spindle-nut drive.

A very exact guidance of the carriage is achieved as a result of the cooperation between the wheels and the rails. Specifically, the wheels of the carriages cooperate with the rails by abutting three sides of their associated rails. An absolutely reliable, unshiftable standing position of the carriage is achieved during drilling in that each carriage is fixable by means of blocking devices having brake blocks. And, these blocking devices can be clamped against the rails. Such a device achieves a high degree of drilling accuracy at low cost and achieves a fixed position within a very short time.

As the closed frame of the drilling device guarantees high stability, the drilling units can be arranged to the side of the frame.

Other objects, advantages and the nature of the invention will become readily apparent from the detailed description of the invention taken in connection with the accompanying drawings.

BRIEF DESCRIPTION OF DRAWINGS

FIG. 1 is a schematic side view of a drilling machine embodying the invention;

FIG. 2 is a top view of the drilling machine of FIG. 1;

FIG. 3 is a front view of the drilling machine looking in the direction of the arrow A in FIG. 1;

DETAILED DESCRIPTION OF THE PREFERRED EMBODIMENTS

Referring to FIGS. 1 to 3 of the drawings, the drilling machine includes a frame R comprising a horizontal machine underpart 2 or lower beam, two spaced side parts 3 and 4 attached to the ends of the underpart 2 and an upper beam 5 attached to the heads of the side parts. These four parts of the rectangular frame R have a square cross-section and are welded from steel sheets or plates, so that they are hollow on the inside and can receive both pipes and aggregates. The other parts of the machine are also produced in the same constructional manner.

Figure 4:
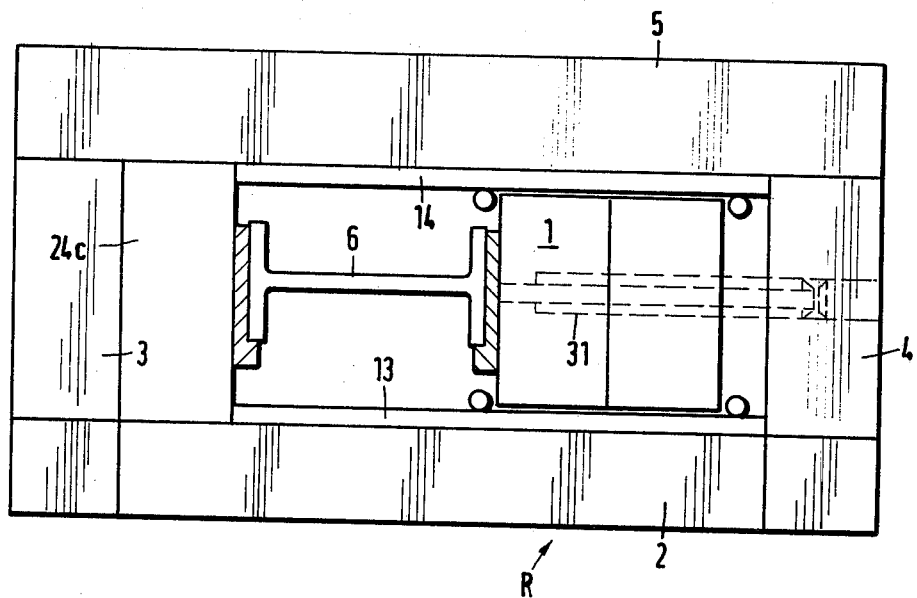
FIG. 4 is a simplified front view of the drilling machine of FIG. 1 with details of the drilling units omitted for simplicity and showing a very broad workpiece.
Figure 5:
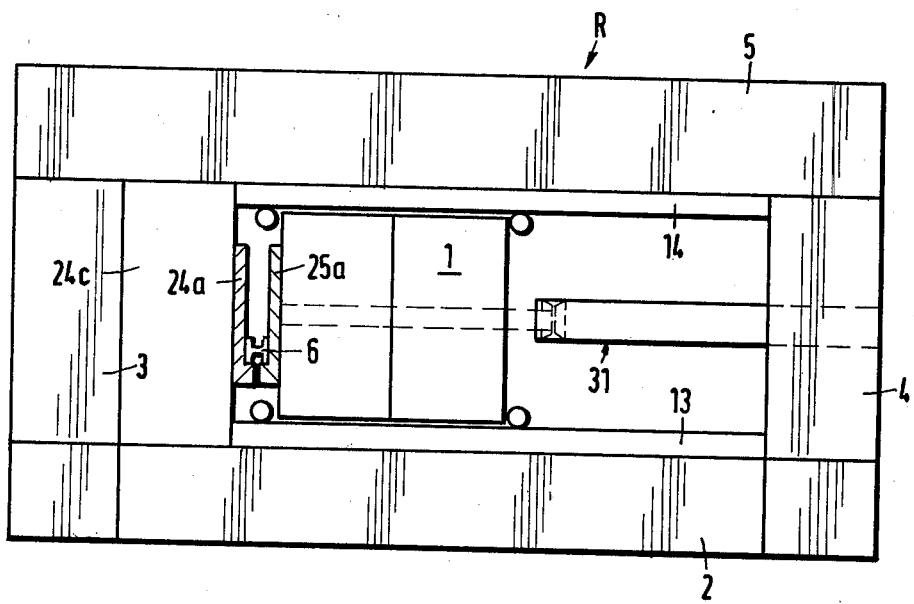
FIG. 5 is a view similar to that of FIG. 4 and showing a very narrow workpiece.

The frame R forms a rectangular inner opening which is greater in width than in height. A workpiece 6 is pushed through the rectangular inner opening at right angles to the plane of the frame. A first box-type carriage 1 is arranged in the frame opening so as to be horizontally movable. This carriage 1 fills the opening with its height and runs parallel to the longitudinal axes of the machine underpart 2 and the upper beam 5, and therefore, the carriage also runs or is movable in a direction parallel to the central plane of the frame. As the frame opening is about twice as wide as the length of the carriage 1 in the shown embodiment, the latter can be shifted by about the extent of its length (see FIGS. 4 and 5).

The drilling machine is provided with a first drilling unit 7, a second drilling unit 8, and a third drilling unit 9. Each of the drilling units 7, 8 and 9 includes a drilling spindle 7a, 8a and 9av, respectively. Each of the drilling units are carried by their own respective carriages. First carriage 1 carries and guides a second carriage 10 which carries and guides the second drilling unit 8. The first drilling unit 7 is carried and guided by a third carriage 11 in a direction opposite to and horizontally arranged relative to the second drilling unit 8. The third drilling unit 9 is arranged for vertical movement between the first and second drilling units and is carried and guided by a fourth carriage 12.

The three carriages 10, 11 and 12 are positioned on different sides of the workpiece 6.

Figure 8:
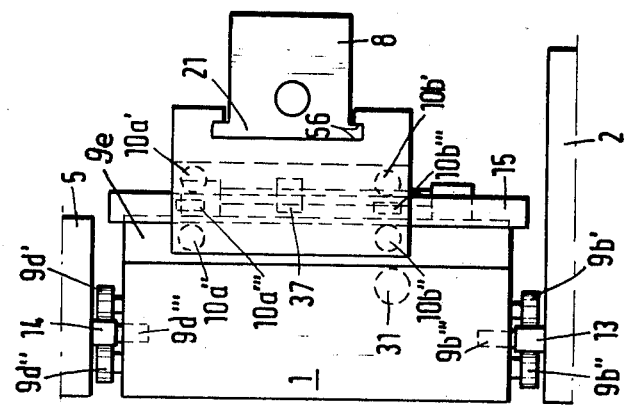
FIG. 8 is a sectional view taken along sectional line C—C of FIG. 7.

Single rails 13 and 14 are provided on the horizontal machine underpart 2 and upper beam 5, respectively, to guide the carriage 1. Wheels or rollers generally designated 9a, 9b, 9c and 9d are provided on carriage 1 to cooperate with the rails 13 and 14 to guide and control the direction of movement of carriage 1. The rails 13 and 14 are each rectangular in cross-section, see FIG. 8, to provide three surfaces for cooperation with the wheels 9a–9d.

The single rail 13 is arranged on the upper side of the machine underpart 2 so as to be parallel to the longitudinal axis of the underpart, and it is shifted slightly in an opposite direction to that in which the workpiece is inserted, i.e. out of the central plane of the frame on which the wheels or rollers of the carriage 1 run. In the same way, the rail 14 is secured on the underside of the upper beam 5 opposite to rail 13. Six wheels abut each rail, and form groups, each including three wheels, e.g. 9c', 9c'', 9c''' or 9d', 9d'', 9d''' form the groups 9a, 9b, 9c, and 9d and abut the three different sides of the rail 13 or 14 in such a way that a wheel, e.g. 9c', touches only a single side surface of the rail 14. A second wheel 9c'' is arranged on the opposite side surface of the rail 14, and a third wheel 9c''' abuts on the (upper or lower) side of the rail between the two side surfaces. As the carriage has four groups of three wheels 9a–9d of such wheels, two groups of each of which abut one of the rails 13 or 14, it is safely guided. A hydraulic cylinder-piston unit 31 is arranged parallel to the rails 13, 14 between a plane running through the rails 13, 14 and a plane running vertically through the axis of the drilling spindle 8a. The unit 31 includes a cylinder 32, a piston 33 and a piston rod 34.

Figure 6:
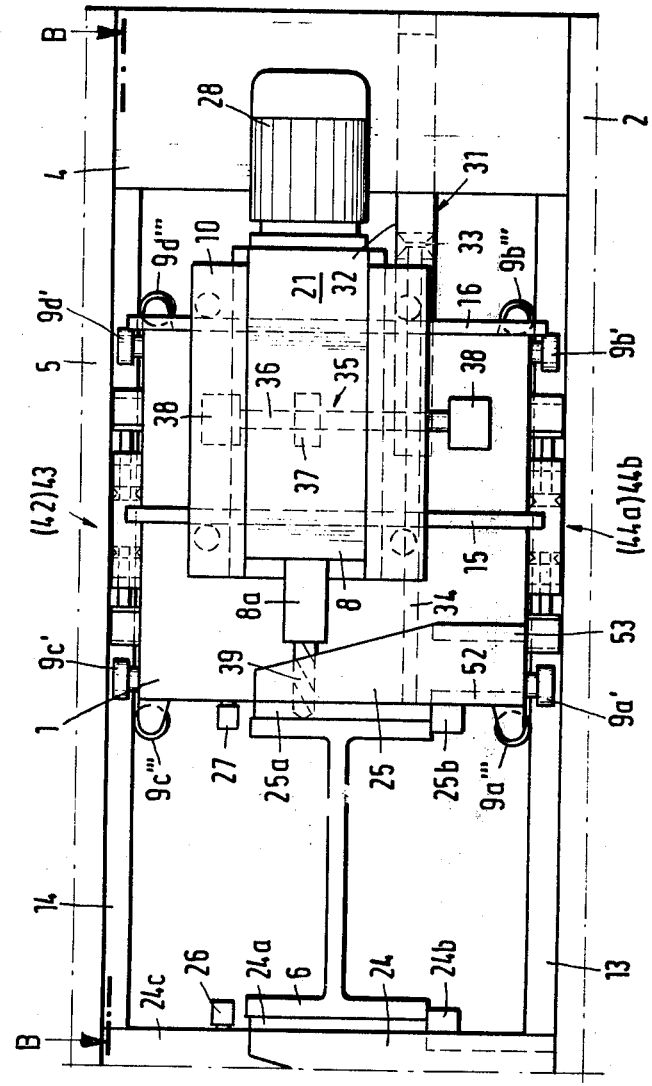
FIG. 6 is an enlarged partial sectional and partial schematic view of FIG. 1 with the upper drilling unit and a portion of the left side drilling unit as viewed in FIG. 1 omitted; the sectional view is taken in a plane parallel to the side as viewed in FIG. 1.
Figure 7:
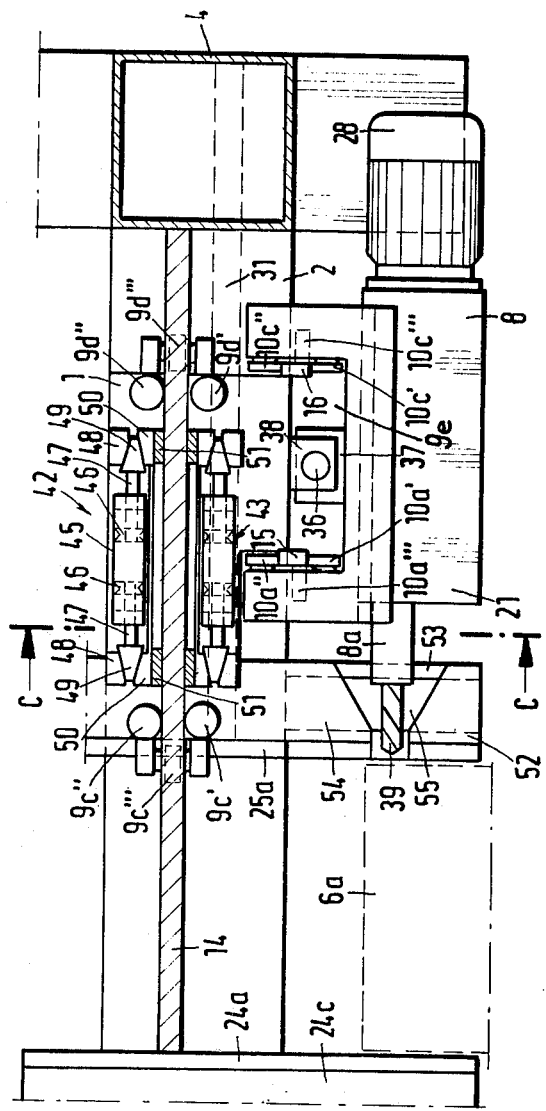
FIG. 7 is a sectional view taken along sectional line B—B of FIG. 6.

As best seen in FIGS. 6 and 7, blocking devices 42, 43, and 44a, 44b are placed on each side of and at the level of the rails 13 and 14, respectively. The blocking devices fix the carriage 1 during the drilling operations. Each of the four blocking devices, see FIG. 7, has a cylinder 45 parallel to its associated rail. Two pistons 46 are arranged, in each cylinder 45, and the piston rods 47 of each piston extend out of the cylinders at opposite ends, and each piston rod 47 carries a wedge 49. When hydraulic pressure is exerted between the pistons 46, the wedge 49 is pressed between two inclined surfaces of an abutment 48 and a transfer wedge 50, whereby the transfer wedge presses a brake block 51 against a side surface of its associated rail. Two blocking devices are arranged on each rail and on opposing sides thereof; and, since each of these blocking devices have two brake blocks, these brake blocks of each two blocking devices are arranged in pairs on opposing sides of both side surfaces, it is possible to produce an extremely high pressure on the rails without distorting them.

First carriage 1 carries two spaced rails 15 and 16. These rails 15 and 16 are of the same type as rails 13 and 14. Second carriage 10 is provided with rollers or wheels generally designated 10a, 10b, 10c and 10d, in FIG. 1.

Side part 3 carries two spaced rails 17 and 18. The third carriage also carries on the bottom surface thereof four groups of rollers or wheels each composed of three individual wheels 11a–11d''', in a manner similar to wheels 10a–10d'''. Rails 17 and 18 are vertically arranged on the side part 3 on an inner and an outer side thereof.

In a similar manner, the upper beam 5 is provided with two spaced rails 19 and 20, and the fourth carriage 12 is provided with cooperating wheels or rollers 12a–12d'''. Rails 19 and 20 are attached to the upper and the lower sides of the upper beam 5. Specifically, wheels 12a', 12a'' and 12a''' and 12b', 12b'' and 12b'''' positioned on opposite sides of the carriage 12 are cooperatively associated with rail 19, and wheels 12c', 12c'' and 12c''' and 12d', 12d'' and 12d''' are also positioned on opposite sides of carriage 12 and are cooperatively associated with rail 20.

Each of the carriages 10, 11 and 12 are respectively provided with a cradle 21, 22 and 23 to carry the drilling units 8, 7 and 9, respectively. The cradles are identical with each other and perform the same functions with respect to their associated drilling units and carriages. The carriages 10, 11 and 12 are U-shaped to receive and guide their respective drilling units.

On the side of the carriage 1, averted from the side where the workpiece 6 is inserted, the two vertical rails 15 and 16 are arranged at a distance from one another and in a plane parallel to the frame R. The rails 15, 16 are enveloped by the carriage 10 which is U-shaped in vertical cross-section and can be moved vertically on the first carriage 1. The legs of the U-shaped carriage 10 lie in a plane which is parallel to a vertical plane running through the longitudinal axis of the workpiece. The legs of carriage 10, in addition to enveloping the rails 15 and 16 also envelop a box-shaped projection 9e on the carriage 1. The four groups of wheels 10a–10d, each are composed of three wheels 10a–10d''' which run on rails 15 and 16. Each of the groups of three wheels abut three side surfaces of the rails in a similar way to those of the first carriage 1. To move the second carriage 10 relative to the first carriage 1, a spindle-nut unit combination is provided comprising a spindle 36 and a nut 37. The spindle 36 is fixed to the carriage 1 by means of a pair of bearings 38 for guiding the nut 37 arranged on carriage. The second carriage 10 has a wide, under cut, horizontal groove, forming a slide path 56 (see FIG. 8) which is parallel to the longitudinal axis of the machine underpart 2. The cradle 21 is arranged in the slide path and forms a part of the drilling units, and in particular the second drilling unit 8. The cradle 21 is moved by means of a conventional spindle-nut unit (not shown).

As best seen in FIGS. 1, 2, 6 and 7, the second drilling unit 8 has a drilling spindle 8a which is immovable in longitudinal direction, and a spiral driller 39 is secured in spindle 8a and is driven through a conventional gear (not shown) by means of a motor 28.

A first clamping jaw 25 is secured to the first carriage 1 over its entire width and is directed towards the workpiece 6. The clamping jaw 25 has a front abutting surface 25a and two rollers 25b under the abutting surface as supports for the flange of the workpiece. Below the abutting surface 25 and behind this shifted towards the second carriage, two side plates 52, 53 are attached vertically to the first carriage 1 and carry a horizontal upper plate 54 with an opening 55. The opening 55 is arranged below the spiral driller 39 in order to receive the chippings produced. A second clamping jaw 24 is arranged parallel to and opposite to the clamping jaw 25. The second clamping jaw 24 is arranged on the frame R so as to be invariable. The second clamping jaw 24 includes a front abutting surface 24a and two rollers 24b. Above the abutting surface 24a and 25a are positioned clamping roller 26, 27 by means of which the workpiece 6 can be fixedly clamped in a vertical direction.

The third carriage 11, which is positioned opposite the second carriage 10, is equal to the second carriage in all parts and differs from the second carriage only in the feature that its associated drilling unit 7 (first drilling unit) is arranged in the opposite direction, so that the drilling spindle 7a is directed onto the flange of the workpiece 6 in a direction opposing the drilling unit 8. The four groups 11a–11d of three wheels are arranged near the four corners of the third carriage 11 and run on the two rails 17 and 18. The fourth carriage 12, which corresponds to carriages 10 and 11, runs on the rails 19 and 20 by means of four groups 12a–12d of three wheels.

The cradle 23 is secured in the carriage 12 and is vertically run therethrough so that the drilling spindle 9av of the third drilling unit 9 is directed vertically towards the workpiece. The carriages 10, 11 and 12 with their U-shaped cross-sections are all driven by spindles or a spindle-nut unit. While the carriages 11 and 12 not only envelop the rails 17, 18, 19 and 20, but also a part of the second part of the frame 3 or of the upper beam 5, the carriage 10 envelops the vertical box-shaped projection 9e of the first carriage 1 which is constructed for this purpose. The projection 9e has the same width as the width of the part 3 or the height of the upper beam 5.

Blocking devices (not shown) are arranged on the carriages 10, 11 and 12 and correspond to those of the first carriage and act on the rails 15–20 . The blocking devices of the first carriage 1 differ from those of the other carriages only in the feature that in specific cases, a hydraulic pressure is exerted which is only so high that it does not block the carriage immediately but rubs the brake blocks a short distance along the rails 13 and 14. This is used via a control means (not shown) when, see FIG. 7, a workpiece 6a abuts only in the area of the first and second drilling spindles 7a, 8a eccentrically of the brake blocks and thereby during its clamping operation of the cylinder 31 exerts a tilting moment on the first carriage 1 around the workpiece 6a. In order to absorb this, a hydraulic pressure lower than usual is exerted on the blocking devices 43, 44, 44a, 44b of the carriage 1 so that the brake blocks of this first carriage brakingly slide a short distance along the rails 13 and 14 until the workpiece 6a is clamped.

While there has been shown what is considered to be the preferred embodiments of the invention, it will be obvious that various changes and modifications may be made therein without departing from the scope of the invention.

I claim:

1. A drilling machine for working on workpieces having a longitudinal axis longer than its transverse and horizontal axis, said machine comprising a frame including a horizontal machine underpart arranged transversely to said longitudinal axis, first and second vertical side parts spaced from each other and connected with the ends of said machine underpart, and a horizontal machine upper beam attached to said side parts; first, second and third drilling units, each said drilling unit including a drilling spindle, a gear and a motor, each said drilling unit being shiftable in a plane parallel to said frame and perpendicular to said longitudinal axis, said first drilling unit being attached to said first vertical side part and having its drilling spindle horizontally directed towards one side of the workpiece, said second drilling unit being attached to said second vertical side part and having its drilling spindle horizontally directed in a direction opposite to that of said first drilling unit towards another side of the workpiece, opposite to the one side of the workpiece, and said third drilling unit being attached to said upper beam and having its drilling spindle vertically directed between said two horizontally directed spindles, the improvement comprising:

at least one first rail attached to said machine underpart;
   at least one second rail attached to said upper beam;
   a first, horizontally driven, carriage including lower wheels and upper wheels, said second drilling unit and said second drilling spindle being movably coupled with and to said first, horizontally driven, carriage;
   said lower wheel being operatively associated with said first rail, and said upper wheels being operatively associated with said second rail, said wheels and said rails guiding said carriage for movement therealong;
   vertical rails on said first carriage;
   a second, vertically running, carriage associated with and carried by said first carriage and carrying said second drilling unit; and,
   second wheels associated with said second carriage and cooperating with said vertical rails for guiding the movement of said second carriage relative to said first carriage.

2. A drilling machine as claimed in claim 1, comprising:
   a hydraulic cylinder-piston unit for securing said first carriage.

3. A drilling machine according to claim 1, comprising a horizontally movable cradle attached on second carriage, said second drilling unit being arranged on said last-mentioned cradle.

4. A drilling machine as claimed in claim 1 or 3, comprising:
   second vertical rails on said first side part,
   a third carriage carrying said first drilling unit, and
   third wheels associated with said third carriage and cooperating with said second vertical rails for guiding the movement of said third carriage relative to said frame.

5. A drilling machine as claimed in claim 4, comprising:
   a horizontally movable cradle attached to said third carriage,
   said first drilling unit being arranged on said last-mentioned cradle.

6. A drilling machine as claimed in claim 1 or 3, comprising:
   horizontal rails on said upper beam,
   another carriage carrying said third unit, and
   additional wheels associated with said other carriage which runs with said additional wheels on said horizontal rails.

7. A drilling machine as claimed in claim 6, comprising:
   a vertically movable cradle attached to said other carriage, said third drilling unit being arranged on said last-mentioned cradle.

8. A drilling machine as claimed in claim 1, comprising:
   a first clamping jaw attached to said first carriage for the horizontal clamping of the workpiece,
   a second clamping jaw attached to said frame and working together with said first clamping jaw.

9. A drilling machine as claimed in claim 8, comprising:
   rollers attached to said first clamping jaw to bear the workpiece.

10. A drilling machine as claimed in claim 1, comprising:
    rollers attached to said first carriage to bear the workpiece.

11. A drilling machine as claimed in claim 1, comprising:
    second vertical rails on said first side part;
    a third carriage carrying said first drilling unit;
    third wheels associated with said third carriage and cooperating with said second vertical rails for guiding the movement of said third carriage relative to said frame;
    horizontal rails on said upper beam;
    a fourth carriage carrying said third unit; and,
    fourth wheels associated with said fourth carriage which runs with said fourth wheels on said horizontal rails.

12. A drilling machine as claimed in claim 11, comprising:
    a spindle-nut drive for each said second, third and fourth carriages for movement thereof.

13. A drilling machine as claimed in claim 11 or 12, wherein said first, second, third and fourth wheels abut three sides of their said associated rails.

14. A drilling machine as claimed in claim 11 or 12, comprising:
    blocking devices including brake blocks for each said carriages for fixing thereof, and means clamping said blocking devices against said rails.

15. A drilling machine as claimed in claim 1, wherein said frame is rectangularly-shaped having a rectangular inner opening, and said drilling units are operatively associated with the sides of said frame surrounding said inner opening through which the workpieces are pushed.

16. A drilling machine according to claim 11, comprising:
- a first horizontally movable cradle attached on second carriage, said second drilling unit being arranged on said cradle,
- a second horizontally movable cradle attached to said third carriage, said first drilling unit being arranged on said cradle, and
- a vertically movable cradle attached to said fourth carriage, said third drilling unit being arranged on said cradle.

17. A drilling machine as claimed in claim 16, comprising:
- a hydraulic cylinder-piston unit for securing said first carriage,
- a spindle-nut device for each said second, third and fourth carriages for movement thereof, and
- blocking devices including brake blocks for each said carriages for fixing thereof, and means including clamping means for clamping said blocking devices against said rails,
- said blocking device for said first carriage differing from said blocking devices for said other carriages, said blocking device for said first carriage exerting pressure to rub said brake blocks a short distance along said first-mentioned rails.

* * * * *